(12) United States Patent
Duchek

(10) Patent No.: US 6,286,874 B1
(45) Date of Patent: Sep. 11, 2001

(54) HOSE COUPLING PROTECTOR

(76) Inventor: Arthur Duchek, P.O. Box 87, Columbia, NJ (US) 07832

( * ) Notice: Subject to any disclaimer, the term of this patent is extended or adjusted under 35 U.S.C. 154(b) by 0 days.

(21) Appl. No.: 09/450,202

(22) Filed: Nov. 29, 1999

Related U.S. Application Data

(60) Provisional application No. 60/135,809, filed on Apr. 24, 1999.

(51) Int. Cl.[7] .................................................. F16L 11/12
(52) U.S. Cl. ................................................ 285/45; 404/3
(58) Field of Search .............................. 404/3; 285/45, 285/61; 14/69.5; 104/275; 174/68.1, 97, 101; D13/155; 138/106; 405/157

(56) References Cited

U.S. PATENT DOCUMENTS

| | | | |
|---|---|---|---|
| D. 184,913 | * | 4/1959 | Cataldo .............................. D13/155 |
| 291,371 | * | 1/1884 | Mayall ............................. 174/101 X |
| 1,879,565 | * | 9/1932 | Smith ..................................... 285/45 |
| 2,595,452 | * | 5/1952 | Geist et al. ......................... 174/68.1 |
| 3,022,095 | * | 2/1962 | Mazeika ................................ 285/45 |
| 4,741,559 | * | 5/1988 | Berghman ......................... 285/45 X |
| 4,930,543 | * | 6/1990 | Zuiches .............................. 285/45 X |
| 5,024,249 | * | 6/1991 | Botsolas ............................ 285/45 X |
| 5,095,822 | * | 3/1992 | Martin .................................. 104/275 |
| 5,267,367 | * | 12/1993 | Wegmann, Jr. ..................... 404/3 X |
| 5,534,665 | * | 7/1996 | Long ................................. 174/68.1 X |
| 5,753,855 | * | 5/1998 | Nicoli et al. ..................... 174/101 X |
| 5,755,527 | * | 5/1998 | Dufresne ................................. 404/3 |
| 6,202,565 | * | 3/2001 | Henry .................................. 104/275 |

FOREIGN PATENT DOCUMENTS

6121431 * 6/1994 (JP) ................................. 174/101 X

* cited by examiner

*Primary Examiner*—Lynne H. Browne
*Assistant Examiner*—David E. Bochna
(74) *Attorney, Agent, or Firm*—Charles E. Temko

(57) ABSTRACT

A molded synthetic resinous closure into which hose connections between parked vehicles and a water source are positioned to be protected against damage caused by vehicles running over the connector parts.

2 Claims, 3 Drawing Sheets

HOSE COUPLING PROTECTOR

This Appln. claims benefit of Provisional Ser. No. 60/135,809 filed Apr. 24, 1999.

BACKGROUND OF THE INVENTION

This invention relates generally to the field of protective closures, and sore particularly to an improved molded shield of rigid configuration adapted to enclose interconnected hoses in the area of interconnection, so that relatively fragile interconnecting parts are shielded from damage caused by the overrunning of tires of vehicles when the connector is positioned in an active driveway.

Particularly in the case of passenger vans and trailers which are temporarily parked in trailer camps and similar areas, it is usual to connect the vehicle water tank to a fixed water source both for purposes of refill and continuous service using flexible hoses. The hoses are interconnected along the length thereof using known metallic or synthetic resinous threaded couplers which often lie in the path of other moving vehicles exiting or leaving the area. While the hoses can usually survive distortion by virtue of inherent flexibility, the threaded couplings are not flexible, and being relatively thin-walled, they are unable to resist permanent distortion which destroys the ability to be unthreaded when interconnection is no longer required.

SUMMARY OF THE INVENTION

Briefly stated, the invention contemplates the provision of an improved relatively rigid molded housing forming channels which accommodate one or more interconnected hose couplings, as well as adjacent segments of hose, one surface of which is adapted to contact the surface of an active driveway to resist downward pressure resulting from passage of vehicle wheels rolling over an upper surface thereof. The device also includes means for preventing accidental disengagement of the hoses and couplings while renting upon the driveway.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
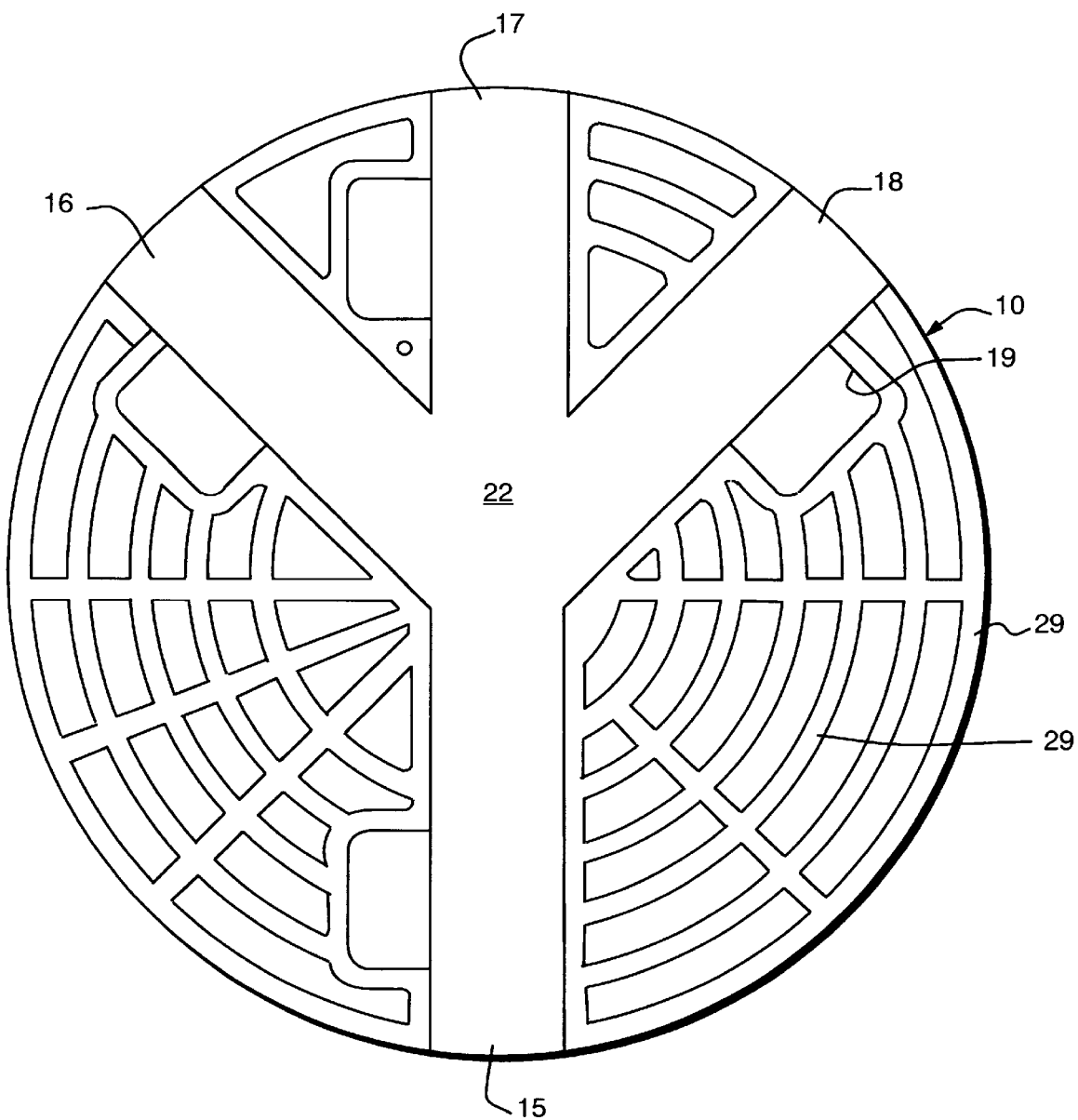
FIG. 1 is a bottom plan of an embodiment of the invention.
Figure 2:
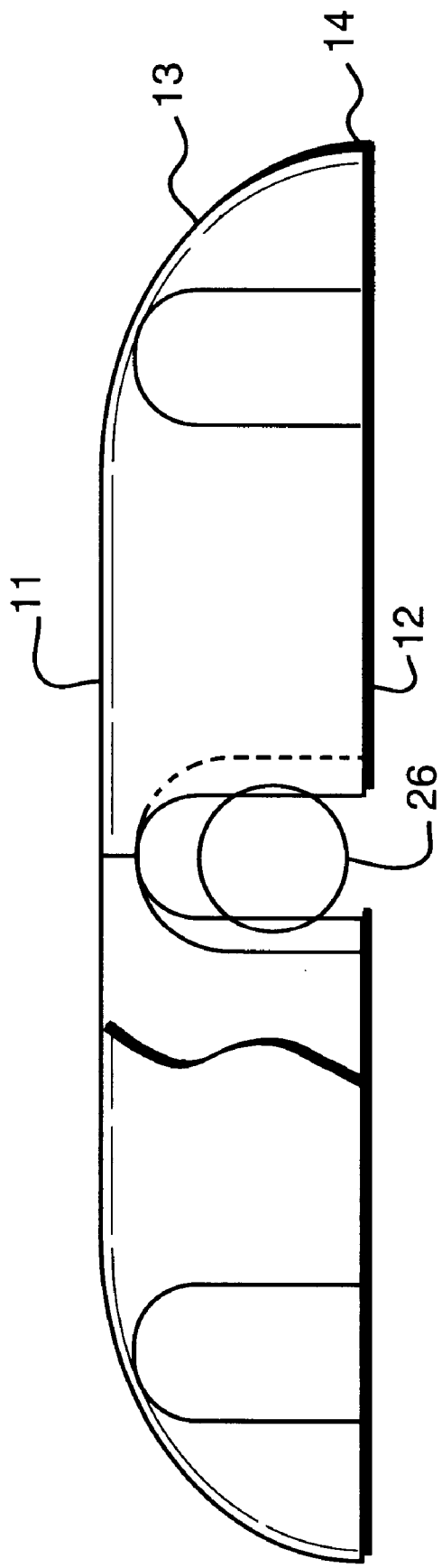
FIG. 2 is a schematic side elevational view thereof.

In accordance with the invention, the device, generally indicated by reference character 10, comprises a relatively rigid plastic molding of synthetic resinous material. It is bounded by an upper surface 11, a lower surface 12, and a curved arcuate side surface 13 extending upwardly from a peripheral edge 14.

Figure 3:
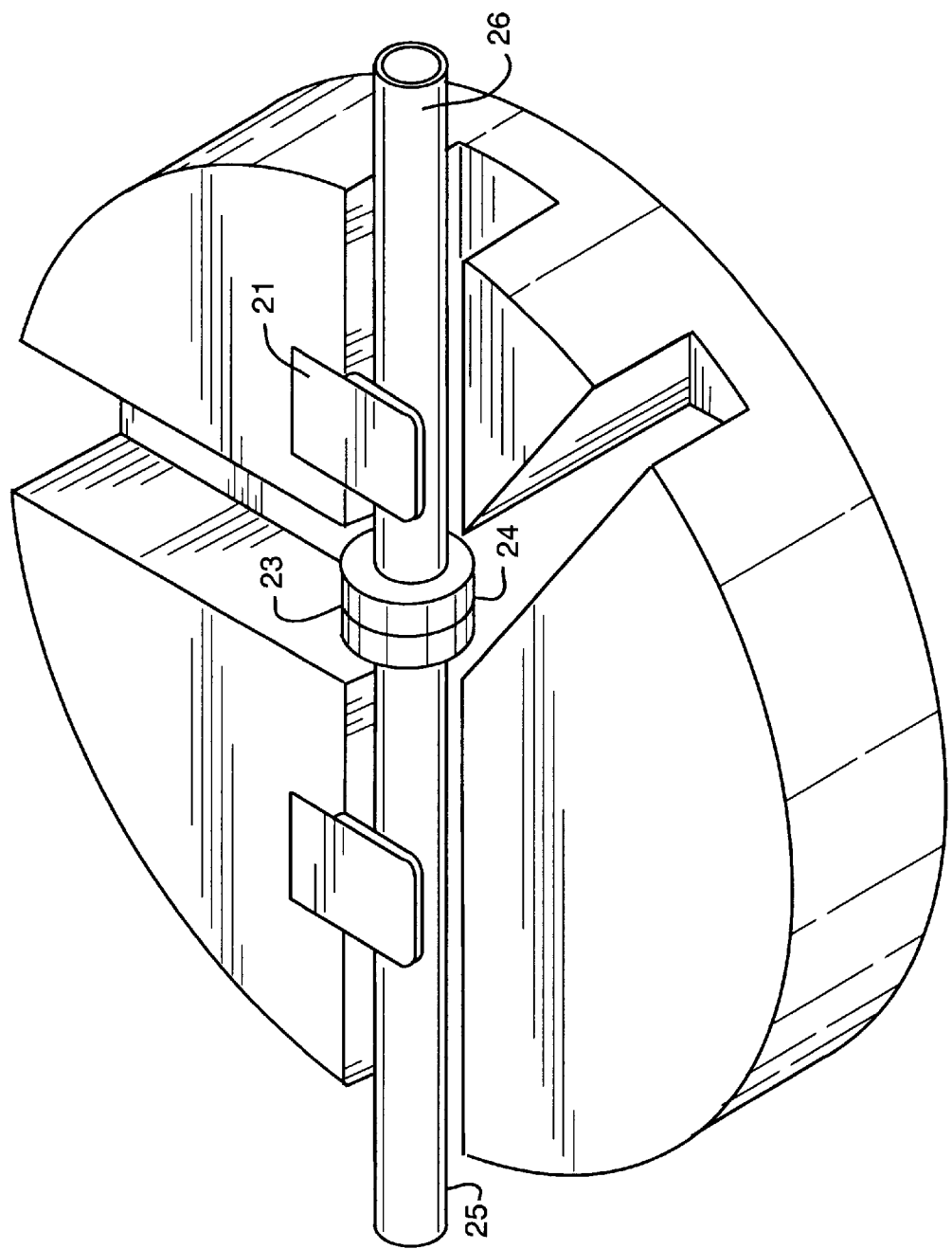
FIG. 3 is a schematic bottom perspective view thereof.

Extending from the lower surface 12 are first, second, third, and fourth channels 15–18, each of which is provided with a laterally-extending channel 19 which resiliently retains a retaining tab 21 (FIG. 3).

The channels 15–18 meet at a generally centrally positioned area 22 which accommodates a threadedly interconnected pair of coupling devices 23–24, from which hose segments 25 and 26 extend. Although the interconnection of a pair of hose segments is illustrated, it will be understood by those skilled in the art that a Y-shaped coupling which accommodates three corresponding hose segments (not illustrated) can also be employed.

The device is preferably of a thickness ranging from one and one-half to two and one-half inches thick, so as to permit a very limited degree of compression without damage to the coupling devices. As illustrated in FIG. 1, the device may be of hollow configuration with an added number of reinforcing ribs 29 provided, such construction facilitating injection molding procedures.

It may thus be seen that I have invented novel and highly useful improvements in hose coupling protector devices, in which an inexpensive reusable device is employed to shield the weight of vehicles from relatively easily damaged hose couplers where they must, of necessity, be positioned in an active driveway. The device prevents the couplers from being distorted in such manner that they cannot be subsequently unthreaded, so not only can they be reused, but the need for replacing them in the event of damage, a relatively complicated procedure, is avoided.

I wish it to be understood that I do not consider the invention to be limited to the precise details of structure shown and set forth in the specification, for obvious modifications will occur to those skilled in the art to which the invention pertains.

I claim:

1. A coupling protector for use in interconnecting relatively flexible water hoses positioned on an active driveway comprising: a rigid circular unitary body of synthetic resinous material having a planar upper surface, a planar lower surface, and an arcuate curvelinear side wall interconnecting setup in lower walls; said body having a plurality of generally rectilinear channels interconnected at a substantially central point in said body, said channels connecting with openings in said side walls; at least some of said channels having hose retaining means in the form of planar tabs which extend from an edge portion of a respective channel, said body being of hollow configuration and having a plurality of reinforcing ribs extending from said upper surface to said lower surface and positioned between said channels to provide rigidity to said body when under axial compression.

2. A coupling in accordance with claim 1, said reinforcing ribs being disposed in mutual concentric relation between said channels.

* * * * *